(12) United States Patent
Williams

(10) Patent No.: US 8,756,692 B2
(45) Date of Patent: Jun. 17, 2014

(54) CONTROLLING NETWORK-BASED APPLICATIONS WITH SOCIAL MEDIA POSTINGS

(75) Inventor: Tia Williams, Atlanta, GA (US)

(73) Assignee: Eureka! It Works, LLC, Atlanta, GA (US)

( * ) Notice: Subject to any disclaimer, the term of this patent is extended or adjusted under 35 U.S.C. 154(b) by 0 days.

(21) Appl. No.: 13/316,282

(22) Filed: Dec. 9, 2011

(65) Prior Publication Data

US 2013/0014258 A1 Jan. 10, 2013

Related U.S. Application Data

(60) Provisional application No. 61/504,872, filed on Jul. 6, 2011.

(51) Int. Cl.
*G06F 11/00* (2006.01)

(52) U.S. Cl.
USPC .......................................................... 726/24

(58) Field of Classification Search
USPC .............................. 726/22–25; 705/319, 14.73
See application file for complete search history.

(56) References Cited

U.S. PATENT DOCUMENTS

| 2009/0048904 | A1* | 2/2009 | Newton et al. ................. 705/10 |
| 2011/0113084 | A1* | 5/2011 | Ramnani ...................... 709/201 |
| 2011/0213670 | A1* | 9/2011 | Strutton et al. ............ 705/14.73 |
| 2011/0295612 | A1* | 12/2011 | Donneau-Golencer et al. ............................. 705/1.1 |
| 2012/0246097 | A1* | 9/2012 | Jain et al. ........................ 706/12 |
| 2012/0297477 | A1* | 11/2012 | Raviv ............................ 726/22 |

* cited by examiner

*Primary Examiner* — Brandon Hoffman
*Assistant Examiner* — Anthony Brown
(74) *Attorney, Agent, or Firm* — Law Office of Dorian Cartwright

(57) ABSTRACT

A content posting associated with a user of the social media service and including an embedded command is received. The posting can be submitted to the social media service as a status update or message to the social media account associated with the application. The content posting is processed to generate a request to one or more data sources to query for information or perform an action (e.g. update a data record). The response is parsed to extract data values which are inserted into pre-configured templates in accordance with the characteristics of the response delivery method preference set by the user and stored in a application user profile.

14 Claims, 7 Drawing Sheets

CONTROLLING NETWORK-BASED APPLICATIONS WITH SOCIAL MEDIA POSTINGS

CROSS-REFERENCE TO RELATED APPLICATIONS

This application claims the benefit of priority under 35 U.S.C. 119(e) as to U.S. Application No. 61/504,872, filed Jul. 6, 2011, entitled CONTROLLING NETWORK APPLICATIONS WITH SOCIAL MEDIA NETWORKS AND BLOG POSTINGS, by Tia Williams, the contents of which is hereby incorporated by reference in its entirety.

FIELD OF THE INVENTION

The invention relates generally to network applications, and more specifically, to controlling network applications by processing commands embedded within social media postings.

BACKGROUND OF THE INVENTION

The advent of social media networking and blogging has created convenient new channels for cloud communication with friends. Generally, social media networks and blogs are user driven in that individuals provide the content and control the information exchange. For example, a Twitter or Facebook user has an individual profile page that shows their personal activity stream of content postings and the activity streams of their network of friends. One popular way of sharing information is through a status update which can be posted and shared with their entire network of friends, or sent directly to an individual friend or group.

Plug-ins for content management systems and other sharing scripts allow content publishers to embed sharing functionality into their websites. This allows users to share content with members of their social media network or readers of their blog. Typically, this is limited to the URL at which the content was found. For example, if the user has found an interesting article and would like to post the URL of the article on their social media network or blog, the user selects the respective function if the content publisher has implemented a sharing plug-in or script.

If sharing functionality is not available on a website and the user would like to share content found on the website with members of their social media network or readers of their blog, the user has to manually copy and paste the desired block of content or the URL at which the content was found, and then manually post it as an update to their social media network or blog. For example, if the user would like to share the weather forecast for an upcoming outdoor event with members of their social media network or blog, the user must first perform a manual query on the website of a weather forecast provider. If sharing functionality is not available, the user must copy and paste the actual contents of the forecast or the URL at which the forecast was found, and post it as an update to their social media network or blog. These operations are even more difficult for the users of mobile devices.

What is needed is a technique to automate the request, update, and delivery of dynamic information by processing commands embedded in social media postings.

SUMMARY

To meet the above-described needs, methods, computer program products, and systems to process commands that control a network-based application running in conjunction with a social media service are provided. For example, a user can embed a command within a social media posting to query deals and coupons and share the results with their followers. In another example, a user can embed a command within a social media posting to make a monetary donation to a non-profit institution or political campaign and share a confirmation of the donation with their followers.

In one embodiment, a social media posting containing a command is received. The posting can be submitted to the social media service by a user as a status update which updates the activity feed of the user, or as a message sent to the social media account associated with the application. The social media posting containing a command is processed to generate a query to one or more data sources.

A response to the query comprising data from the data source(s) is received. The response is formatted in accordance with characteristics of the response delivery method, which can include a social media service or other delivery method. In some embodiments, the formatted response is then sent to the social media service or other response delivery method for delivery. Other response delivery methods can include non-social media services. For example, a user can receive a response as an SMS to their cell phone or as an update to an RSS feed that can be parsed and the results displayed in a web page or RSS reader.

Advantageously, a social media user can quickly and automatically update their activity feeds with dynamic data and share that data with their friends and followers. Moreover, users of mobile devices and/or Internet appliances with limited input capabilities can simplify complex tasks with fewer keystrokes.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems to process commands that control a network-based application running in conjunction with a social media service. For example, a user can embed a command within a social media posting to query deals and coupons and share the results with their followers. In another example, a user can embed a command within a social media posting to make a monetary donation to a non-profit institution or political campaign and share a confirmation of the donation with their followers.

Figure 1:
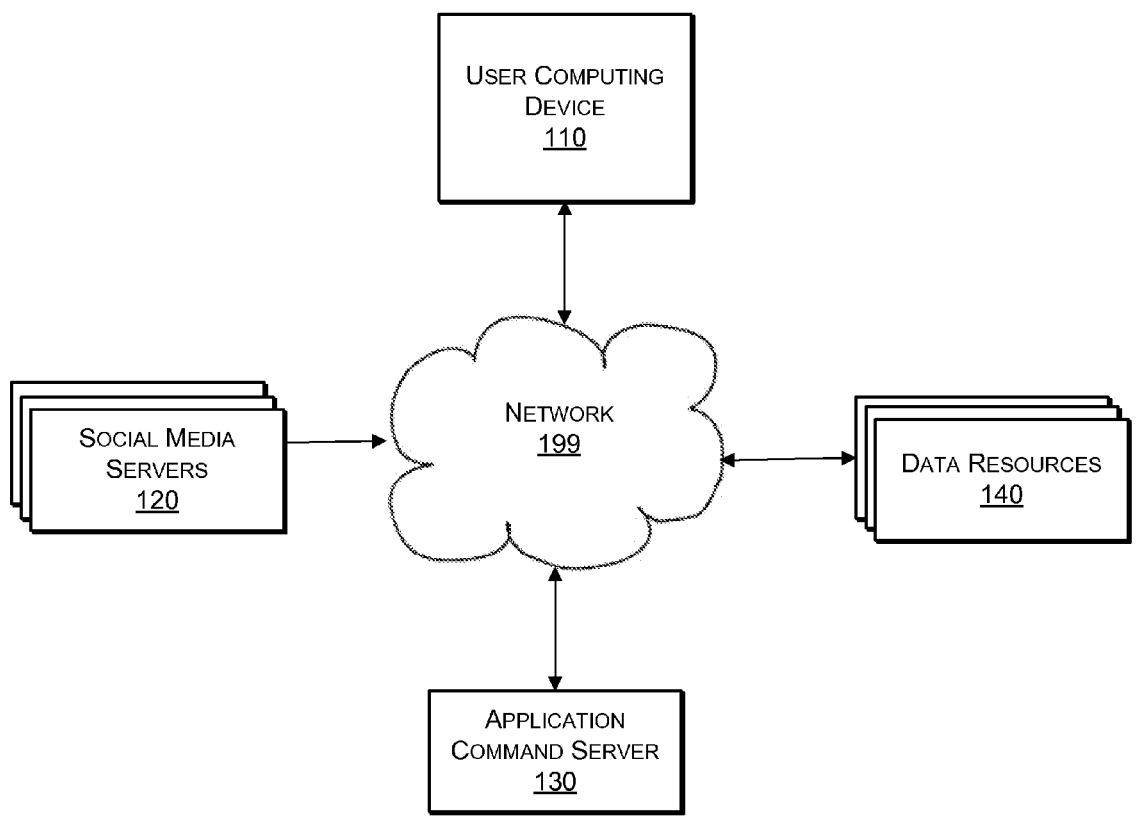
FIG. 1 is a high-level block diagram illustrating a system to control network-based applications through social media postings, according to one embodiment.

FIG. 1 is a high-level block diagram illustrating a system 100 to control and/or instruct a network-based application to perform an action through a social media posting, according to one embodiment. The system comprises a user computing device 110, social media servers 120, an application command server 130, and data resources 140. The components are each coupled to a network 199, such as the Internet or a cellular network, through any suitable wired (e.g., Ethernet) or wireless (e.g., WiFi or 3G) medium, or combination. Additional network components within a communication channel are possible (e.g., firewalls, virus scanners, routers, access points, etc.).

The user computing device 110 can be, for example, a personal computer, a laptop computer, a tablet computer, a smart phone, a mobile computing device, an Internet appliance, or the like. A user can employ the computing device 110 to interact with social media services and other resources available on the network 199. In one embodiment, the user logs on to Twitter to post content to be read by their followers, and to review content postings made by other Twitter users. In another embodiment, a post made by the user include a command intended to instruct a remote network-based application to perform a corresponding action. One possible action is to automatically publish results on a social media service. Thus, the user computing device 110 can also be used to view the results of application processing initiated by the user, which can be read by their social media followers.

The social media servers 120 includes one or more individual social media servers corresponding to one or more social media services. As used herein, social media refers to any type of cloud-based content system for interaction with other users. For example, social media networks such as Twitter and Facebook allow users to build networks by following other users. In turn, the users can be followed themselves. The content postings of the user, as well as their actions, and other user profile information is published and can be accessed by others. Further, an aggregated chronological feed publishes content postings, actions, and other information on a rolling basis. This allows a user to be quickly updated with the latest information from members of their social media network. In another example, blogs such as WordPress and Tumblr allow a user to publish information beyond a specific social media network. In still another example, social media networks can be integrated within other applications such as discussion forums, online video games, network-based music services, and the like.

While the embodiments primarily described in detail below are in connection with the Twitter platform for social media, this is only an exemplary implementation. Other embodiments can use, for example, Facebook, MySpace, Ning, FourSquare, LinkedIn, WordPress, Tumblr, Google-F, Movable Type, LiveJournal, Type Pad, instant messenger applications, or the like.

Messaging functionality available on the Twitter platform can include "direct message", "@reply", and "re-tweet". Direct messaging allows a user to send private messages to one or more of their followers. In order to send a direct message, the user usually must have direct messaging enabled on their Twitter account. In that case, a user cannot send direct messages to a secondary user who is not "following" them. Following another user simply means subscribing to their Twitter updates.

Sending an @reply allows a user to specifically address messages to a secondary user. The messages are public and not private as in direct messaging. Sending an @reply does not require users to follow each other. However, the secondary user can view the message on their timeline if following the user that sent them the @reply. A timeline is a stream of content postings or tweets listed in chronological order and available on the homepage of the user after logging in to Twitter.com or 3rd party Twitter application. The timeline is also available as an RSS feed. Unless the user is blocked, the secondary user can view the message on their replies tab after logging in to Twitter.com or 3rd party Twitter application. Re-tweeting a message allows a user to forward a content posting or tweet to their own followers.

The system 100 takes advantage of the messaging capabilities of Twitter and adds smart functionality to execute prescribed commands contained within them. Other social media networks such as WordPress or Tumblr do not currently provide native messaging capabilities. However, other methods of content post ingestion can allow for the execution of prescribed commands by the system 100. For example, plug-ins installed through the administration panel of WordPress could allow the system 100 access to content postings containing commands. An alternative method is for the system 100 to ingest the WordPress RSS feed for the blog. One of ordinary skill in the art would be able to apply the disclosure herein to future post ingestion improvements to Twitter and other social media networks.

In some embodiments, applications can be configured to operate in conjunction with a social media platform. For example, applications can allow users to track data such as stock performance, sports scores, and weather forecasts. Users can play video games, plan events, perform financial transactions, and manage media galleries, just to name a few. In one embodiment, a user posting on one of the social media servers 120 provides a command to an application, as described in more detail below.

The application command server 130 automates the request, update, and delivery of dynamic information by processing commands embedded in social media postings. To do so, the application command server 130 identifies commands embedded within posts of registered users by monitoring Twitter direct message and activity feeds. Once a command is processed and executed, the results can be sent back to a user (or to another user, or automated system), distributed to a group, published on one of the social media services, or delivered through another response delivery method. For example, the results can be published as a content posting or tweet to the Twitter account of the user or published as a status update on the Facebook page of the user. In both cases, the activity feeds of the users on the respective social media networks are updated with the dynamic information contained within the post.

The command can be of varying formats. Moreover, the command can be composed of text and/or multimedia. For Twitter, a command in the form of a text direct message string can be up to 140 characters of length (including addressing of the direct message to the Twitter account associated with the application).

The data resources 140 can be a database, a web service, or any other information resource. The data resource 140 can be internal to, or external to, the system 100. External resources such as Google APIs are leveraged to generate a request or to query data as determined by the command. Native resources can be integrated for compatibility or customization.

Figure 2:
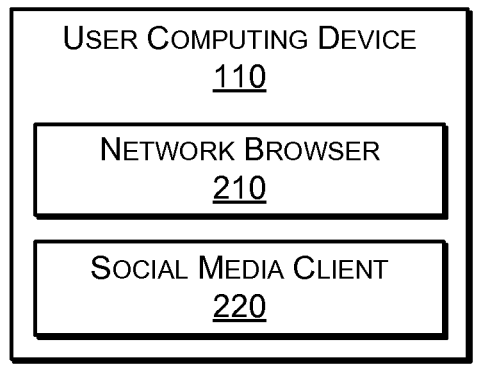
FIG. 2 is a block diagram illustrating a user computing device in more detail, according to one embodiment.

FIG. 2 is a block diagram illustrating a user computing device 110 in more detail, according to one embodiment. The user computing device 110 includes a network browser 210 and a social media client 220. Additional general components can also be included, as described below with respect to FIG. 8.

The network browser 210 can be any standard or mobile browser such as Internet Explorer, Mozilla Firefox, Google Chrome, Apple Safari, or any HTML rendering application with networking capability. The network browser 210 can be a stand-alone application or integrated within another dominant application. Using the network browser 210, a user can access cloud-based social media services to submit postings, and review the postings of others.

The social media client 220 can be a mobile application that provides direct access to social media services, as opposed to the generic platform of the network browser 210. In one example, a Twitter client is downloaded to a mobile phone as a mobile application. A user initiating the Twitter client can access the service with less keystrokes and have access to the functionality most commonly used in the network browser 210.

Figure 3:
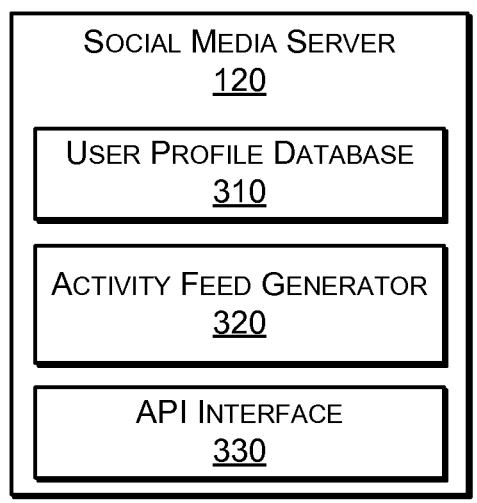
FIG. 3 is a block diagram illustrating a social media server in more detail, according to one embodiment.

FIG. 3 is a block diagram illustrating the social media server 120 of FIG. 1 in more detail, according to one embodiment. The social media server 120 has a user profile database 310, an activity feed generator 320, and an API interface 330. Additional general components can also be included, as described below with respect to FIG. 8.

The user profile database 310 stores information for registered users. Individual user profiles are created during registration to store general information such as name and preferences. Additionally, the user profile indicates other users that are part of a social media network such as followers or friends.

An application can also have a user profile. The followers are users that have registered with an application as described in more detail below.

The activity feed generator 320 aggregates the activity of members within the social media network of a user on the social media platform. For example, Twitter content postings or tweets can be aggregated in a timeline, allowing the user to quickly be updated with the latest content postings from members they are following.

The API interface 330 creates a communication channel between the social media server and clients (e.g., the application command server 130 of FIG. 1). Twitter exposes its data via Application Programming Interfaces (APIs). Currently, there are three APIs available for retrieving and modifying Twitter data: two distinct Representational State Transfer (REST) APIs, which allows access to core Twitter data, including timelines, status updates, and user information; and one Search or Streaming API which allows public Twitter updates to be searched programmatically in real time and at high volume. All of the APIs use the GET and POST methods of the HTTP protocol to retrieve and modify data and are available in numerous programming languages, including C++, Java, JavaScript, PHP, Perl, Python, Ruby, etc.

Preferably, in order to use the Twitter APIs, an application is first registered with Twitter. Upon registration, a unique consumer key and secret code is generated and assigned to the application. The key and secret code, in conjunction with the Open Authentication Standard (OAuth) library in the chosen programming language, are used to sign requests made by the application to the API. This signing process allows Twitter to identify the application and the traffic coming from it. In other embodiments, additional toolkits are used, such as the @Anywhere JavaScript framework, which is used to integrate Twitter functionality into websites.

Figure 4:
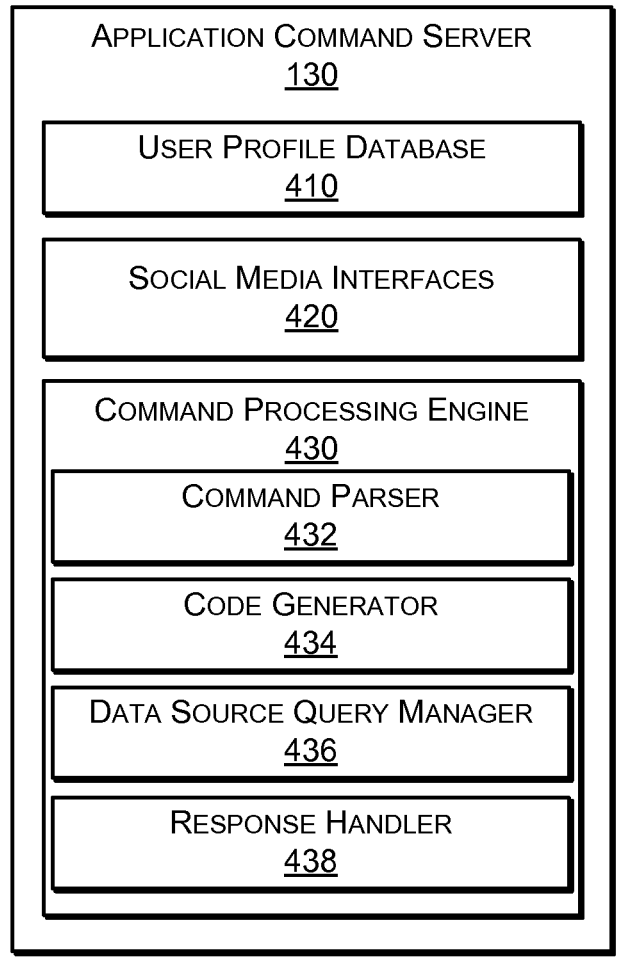
FIG. 4 is a block diagram illustrating an application command server in more detail, according to one embodiment.

FIG. 4 is a block diagram illustrating the application command server 130 of FIG. 1 in more detail, according to one embodiment. The application command server 130 includes a user profile database 410, social media interfaces 420, and a command processing engine 430. Additional general components can also be included, as described below with respect to FIG. 8.

The user profile database 410 maintains profile information for registered users. According to one embodiment, the user profile stores parameters that allow for customization of the application by the user and allows the application access to the user's profile on one or more social media services. A user creates a user profile during a registration process, and can subsequently update the parameters stored within it. The user profile stores general information about a user (e.g., name, email address, billing information if applicable) and also stores preferences for an application (e.g., response delivery method, content and subscription options).

In one embodiment, selection of 'Follow' functionality on the web page of the application or Twitter web page associated with the Twitter account of the application triggers the registration process. In another embodiment, a user follows the Twitter account associated with the application in order to register with the application, and then the application automatically follows back the Twitter account associated with the user. As a result, the user can send messages containing a command directly to the application, or the application can identify commands posted to the activity stream of the user that are not included within direct messages. Although not required, enabling the application to automatically follow back the Twitter account associated with the user allows the application to send a direct message back to the user as an optional response delivery method. If the Twitter account associated with the application does not follow the Twitter account associated with the user, the application cannot send direct messages to the user.

For Twitter, the use of OAuth gives the application command server 130 the ability to act as a proxy on behalf of the user. The two-step process includes authentication and authorization. During authentication, a user provides a username and a password for a Twitter account. During authorization, a user grants an application privileges to user their Twitter account in conjunction with the Twitter REST and Search or Streaming APIs.

The social media interfaces 420 retrieve postings from social media services. The postings are typically pulled using GET methods supported by the interfaces. Some social media services use rate limiting to prevent abuses in data traffic. Currently, Twitter limits unauthenticated GET methods, but loosens the limits for authenticated GET methods by registered applications (e.g., 150 unauthenticated GET requests per hour versus 350 authenticated GET requests per hour). Further, a white listed application can be configured for even greater access (e.g., 20,000 GET requests per hour). Currently, POST methods are not rate limited.

Additionally, the social media interfaces 420 can provide general communications with social media services. Examples include registration of an application with the a social media service, and delivery of results. Other general communications include configuration of polling intervals, API updates, data synching, and the like.

The command processing engine 430 further comprises a command parser 432, a code generator 434, a data source query manager 436, and a response formatter 438. From one perspective, the command processing engine 430 operates according to an input process and an output process. The input process (or ingestion, analysis and assimilation process)

retrieves and pre-processes commands contained in posts using the command parser 432, the code generator 434, and the data source query manager 436. The output process post-processes commands and delivers the results from the query also using the data source query manager 436 along with the response handler 438.

More specifically, the command parser 432 pre-processes commands contained in posts by filtering extraneous information, and then separating commands from data values. For example, one exemplary format using the Twitter direct messaging functionality uses the following format:

d username command parameter(s)

or dm username command parameter(s)

where, 'd' or 'dm' is the prefix for sending a direct message via Twitter, 'username' is the Twitter account associated with the application command server 130, 'command' is the prescribed command as defined by libraries, and 'parameter(s)' is additional criteria needed to executed the command (e.g., data values).

The output of the pre-processing of commands is a series of tokens. The command parser 432 analyzes and matches tokens to code fragments stored in a library unique to the application domain. The code generator 434 assimilates the code fragments associated with the tokens into executable code using assimilation definitions and rules. The executable code is in a generic form. It is the data source query manager 436 that adapts the code to a specific data source, thereby making the code data source-specific. In one embodiment, multiple web services APIs may be queried to perform an action as instructed by a command, resulting in multiple versions of code. More particularly, the generic form of the code is modified to account for one or more web service APIs or other specific formats as needed by the data source 140. For example, Groupon has specific APIs that can be used to perform data search operations that may require a different query format than DealMap. The determination of which data source to use is made by the assimilation definitions and rules. The data source query manager 436 modifies the formatting of the request from its generic form to be specific to the data source(s) and delivers the request to the data source(s).

As part of the output, the data source query manager 436 manages data results received from the data source 140. The response handler 438 formats the data results in accordance with a particular social media service or other response delivery method (e.g. SMS or RSS feed). In one embodiment, the response delivery method is configured as a preference by the user and stored in their user profile. If the response delivery method is Twitter, the results are put into the format of a tweet for general publication or limited publication to a certain group. The results can be delivered using the social media interface 420. Otherwise, the response handler 438 can deliver results using alternative channels (e.g., SMS message or RSS feed). Additional details associated with the application command server 130 are set forth below in association with FIG. 7.

The application command server 130 of FIG. 4 is merely an exemplary implementation. Given the disclosure herein, additional implementations are possible within the scope and spirit of the present invention. Other possible components to enhance the application command server 130 include, but are not limited to, a queue manager, a load balancer, an API rate monitor, an ingestor, a multimedia decoder, a lexical parser, a semantic analyzer, an assimilator, a federated web services engine, a printer, a response delivery engine, and a cache engine.

Figure 5:
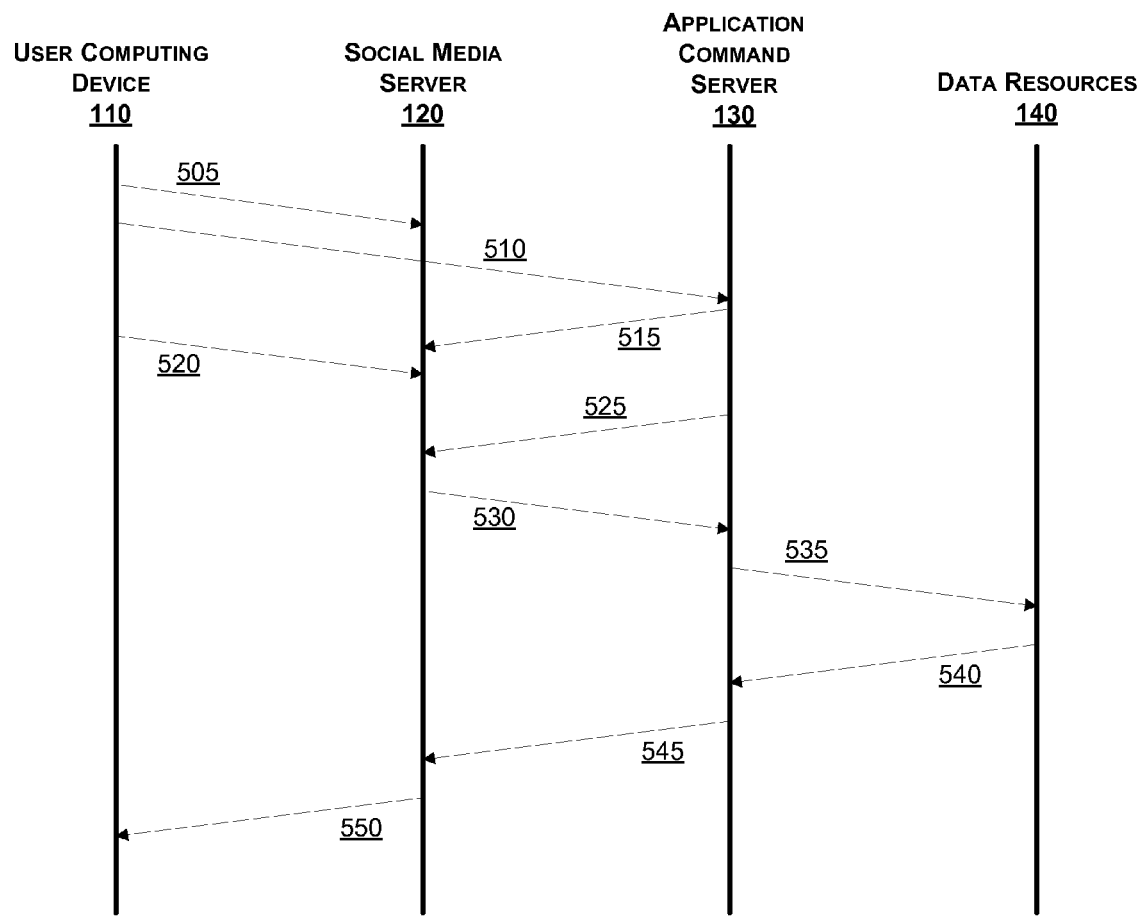
FIG. 5 is a sequence diagram illustrating interactions between components of the system of FIG. 1, according to one embodiment.

FIG. 5 is a sequence diagram illustrating interactions 500 between components of the system of FIG. 1, according to one embodiment. Processes and actions that occur within the components are discussed above and below.

During a set up stage, a user at the user computer device 110 first registers 505 with the social media server 120 to create a social media account thereby creating a user profile with the social media service. Next, the user at the user computer device 110 registers 510 with the application command server 130 to create a user profile with the application. One of the preferences causes 515 a link to be created between the social media account associated with the user and the social media account associated with the application.

During an ingestion and processing stage, the user at the user computer device 110 submits 520 a post to their social media account with an embedded command. The post can be of the form of a status update or a message sent to the social media account associated with the application command server 130. Periodically, the application command server 130 polls 525 the social media server 120 to pull 530 new user posts containing commands using GET methods through the API interfaces of the social media service. The application command server 130 then analyses the posts for commands in order to assimilate the command into executable code.

During an execution stage, the application command server 130 executes the code by sending 535 a request or query to one or more native or third-party data resources 140. Finally, the application command server 130 receives 540 a response which is then parsed and formatted for publication 545 to the social media server 120 or other response delivery method. The user and others can then view 550 results from the user computer device 110 and other devices.

Figure 6:
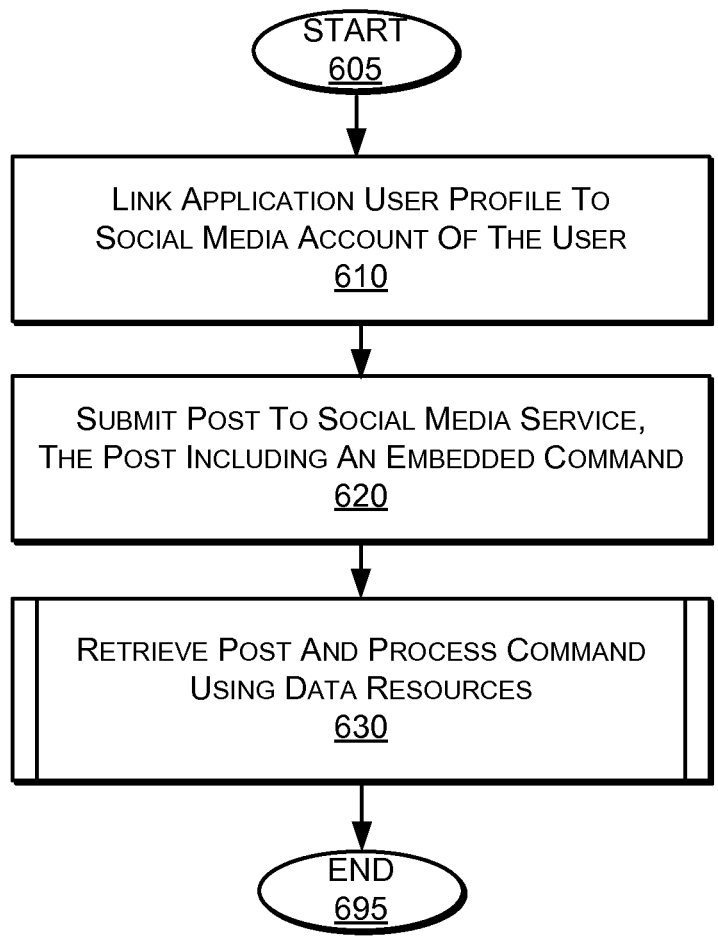
FIG. 6 is a flow diagram illustrating a method for controlling network-based applications through social media postings, according to one embodiment.

FIG. 6 is a high-level flow diagram illustrating a method 600 for controlling network-based applications through social media postings, according to one embodiment.

At step 610, an application is linked to the social media account associated with the user. In one embodiment, a Twitter user selects a 'Follow' function implemented on a web page using the @Anywhere JavaScript framework and OAuth. If the user is not registered with the application and is not logged in to Twitter, the user provides their Twitter authentication credentials, and authorizes the application to act as a proxy on behalf of the user. The user can set preferences and provide additional information that is stored in a user profile that is created by the application. For example, the user can select and/or configure response delivery methods to be either a private direct message, a public tweet, a public @reply, a public post to a different social media service, a public post to an RSS XML file, or a private SMS message sent to a cell phone. To optionally select a private direct message as a response delivery method, the user grants permission to initiate the 'Auto Follow Back' function. This function invokes the friendship/create method of the Twitter API, which allows the Twitter account associated with the application to follow the Twitter account of the user.

At step 620, a post is submitted to a social media service as a status update or message sent to the social media account associated with the application. The post includes an embedded command. In one example, a Twitter user sends a direct message to the Twitter account associated with an application containing a command.

At step 630 posts are retrieved and commands are processed and executed, generating queries and requests to internal and external data resources. The formatted results are delivered to a social media service or other response delivery method (e.g. SMS or RSS feed). Additional details associated with step 630 are detailed in FIG. 7.

Figure 7:
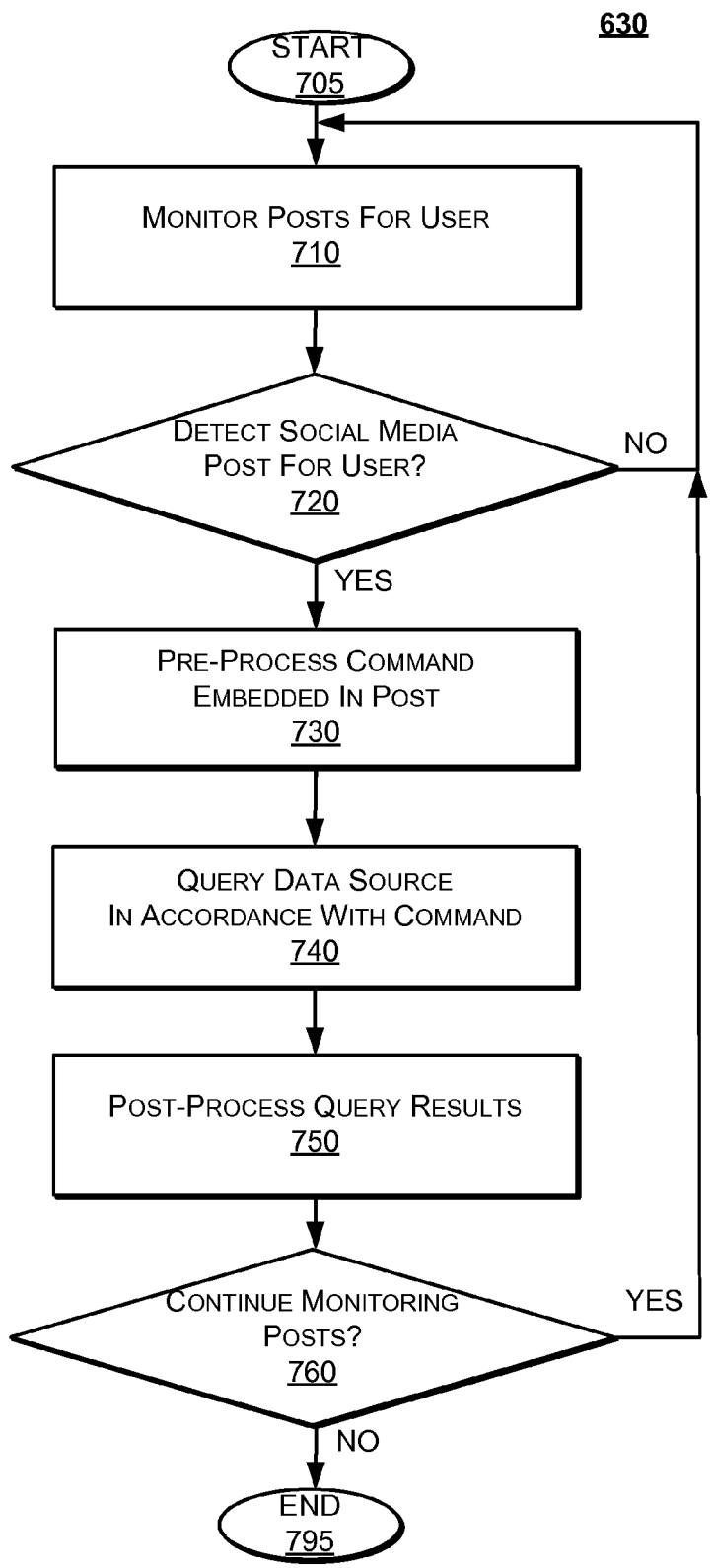
FIG. 7 is a flow diagram illustrating a method for processing commands, according to one embodiment.

FIG. 7 is a flow diagram illustrating the method 630 of FIG. 6 for retrieving and processing commands, according to one embodiment.

At step 710, posts in the form of status updates or direct messages sent to the social media account associated with the application are monitored. Methods within the APIs provided by the social media service are used to poll for new posts. Posts sent via Twitter containing commands are preferably retrieved from the direct_messages method of the Twitter API for the social media account associated with the application. Although not the preferred method, posts from registered users can be retrieved from the activity feed of the user. The polling periods can be evenly distributed or modeled based on historical maximum and minimum usage times for the social media service.

At step 720, if a social media post containing a command is detected from a user, the process continues to step 730. Otherwise, if no new posts are detected, the process returns to monitoring posts in accordance with the polling period.

At step 730, a command embedded in a post is pre-processed. In one embodiment, a command is examined to determine if the content contains standard text, or a shortened URL linked to a multimedia asset. Standard text can be tokenized with comma and/or space delimiters by breaking the content into keywords, functions, operators and/or parameters in preparation for a semantic analysis. Multimedia associated with a URL can also be tokenized by retrieving the file and extracting information with a decoder in preparation for a semantic analysis.

Tokens are mapped to functions and operators uniquely defined for an application domain. The functions and operators, in turn, are mapped to code fragments. In some embodiments, assimilation rules transform the code fragments into executable code.

At step 740, a request is sent to a data source in accordance with the command. A request can be a query for information or an instruction to perform an action (e.g. update a data record). In some embodiments, APIs associated with a data source permit optimum compatibility of interaction with the data source. Examples of requests include a query for the weather forecast for a city or the sports scores for a game. In some embodiments, multiple data sources can be interrogated to increase the amount of relevant data. In other embodiments, multiple data sources can be interrogated for different types of data needed to satisfy a command (e.g., a current score and a history of scores).

At step 750, results are post-processed. The results from the data sources can be received in an XML or other suitable format. Pre-configured templates associated with a response delivery method are used to reformat the results for publication. For example, if the delivery response method is a public Twitter post or tweet, a short string template is used to insert simple name/value pairs conforming to the 140-character limit. If the response is more complex and requires more than 140-characters or includes multimedia (e.g., image, video, audio, interactive maps, or other multimedia formats), an HTML template is used which is not restricted by the character limits imposed by Twitter. For example, a shortened URL that conforms to the 140-character limit can be delivered to the user.

At step 760, if monitoring of posts is configured to continue, the process returns to step 710 to monitor for posts in accordance with the polling period. Otherwise, the process ends at step 795.

The following are exemplary use cases that describe implementations of the systems and methods illustrated above (all names are fictitious):

Example 1

Weather Forecasts

Sarah is the mother of a child participating in a summer soccer league. An avid Twitter user, Sarah posts game scores and summaries, sharing them with her "Wildcats" Twitter group, which includes parents of children on the soccer team, friends, and extended family who attend the games. She wants to share the weather forecast for the upcoming game Saturday. Twitforecasts is a software application that allows Sarah to request weather forecasts on demand from her Twitter account.

Sarah previously visited the twitforecasts.com website to register for the application (Twitter ID twitforecasts), and has authenticated and authorized her Twitter account to be used by the TwitCommand Service. During the registration process, Sarah entered Atlanta, Ga. as her default location and configured her Twitter account as the response delivery method.

Sarah launches her preferred 3rd party Twitter application on her Smartphone. In the status update field of her preferred Twitter application, Sarah enters:
 d twitforecasts July 16 wildcats The system ingests the incoming direct message, analyzes and processes the tokens. A query is performed against the configured weather service API passing the variables "Atlanta, Ga." (configured in her user profile) and "July 16" (contained in the command). The system returns the following formatted response as a status update to the "wildcats" group (contained in the command) to her Twitter account (response method configured in her user profile):
 Weather for ATL GA, Sat July 16: Partly Cloudy—Hi 91° F./Lo 54° F.

If Sarah wants the weather forecast for the current date, she enters the following into her status update field:
 d twitforecasts today
 or
 d twitforecast If a date is not specified in the command, the current date is used by default. If a location is not specified, the default location configured in her user profile is used. The response for the current date would be formatted as follows:
 Weather for ATL GA Today: Currently 82° F. Partly Cloudy—Hi 89° F./Lo 69° F.

If Sarah does not have a default location configured in her user profile or wants the weather for a different location, Sarah enters:
 d twitforecasts chicago il july 16
 d twitforecasts chicago july 16
 d twitforecasts 60611 july 16
 or
 d twitforecasts CHI july 16

A city, state combination or zip code or airport code could be used as the location. For popular locations, the city without the state is accepted. The response would be as follows:
 Weather for CHI IL, Sat July 16: Scattered T-Storms—Hi 83° F./Lo 42° F.

If Sarah wants a 5 day forecast for an upcoming family trip to Orlando, Fla., Sarah enters:
 d twitforecasts orlando fl 5day
The response would be as follows:
 5 day weather for ORL FL: http://url
where url is a shortened URL to a webpage that contains the 5 day forecast starting on the current day. Advertising could be placed on the webpage.

If Sarah wants a 5 day forecast for Los Angeles, Calif., starting on a specific day, Sarah enters:

d twitforecasts LAX 5 day July 16

The response would be as follows:

5 day weather for LAX CA, Sat July 16: http://url where url is a shortened URL to a webpage that contains the 5 day forecast starting on July 16. Advertising could be placed on the webpage.

Example 2

Sports Scores

Robert is the Athletic Director for Oxford High School, a highly competitive academic and athletic private school. The school has developed a national following due to its success in recruiting and preparing students for collegiate and professional athletic success.

Among Robert's responsibilities is the public relations for the different athletic programs at the school. He wants to send updates to current and prospective students, faculty, alumni, parents, boosters, media, college scouts, and fans with an interest in the success of the athletic programs. BleacherTweet is a software program that allows Robert to track and share team performance. For basketball programs, Robert can enter scores and the statistics of individual players, including points, rebounds, assists, and fouls. He can enter commentary, take pictures, and capture video.

Robert previously visited the bleachertweet.com website to register for the TwitCommand Service (Twitter ID bleachertweet), and has authenticated and authorized his personal Twitter account to be used by the TwitCommand Service. During the registration process, Robert entered the team rosters and game schedules for the boys and girls varsity basketball teams. As the response delivery methods, Robert configured the Twitter account of the athletics department, the cell phone number of a local television sports reporter who has given Robert permission to send SMS messages, and an RSS feed. The Oxford IT department embedded a JavaScript portlet into the high school website to parse the RSS feed. Robert has downloaded the BleacherTweet application and installed it on his Smartphone.

Robert launches the BleacherTweet application on his Smartphone. He selects the game "Oxford War Eagles vs. Cambridge Tigers: November 2 @ 6 PM" from the schedule (configured during registration). He is presented with a user interface that allows him to enter performance statistics for the game and individual players. As the game is played, Robert enters the current score of 40 in the Oxford score field, 38 in the Cambridge score field, 2 in the quarter field, and 9:12 in the time remaining field. Robert submits the entry. The system maps the data entered by Robert to a command. His entry of 40 in the Oxford score field, 38 in the Cambridge score field, 2 in the quarter field, and 9:12 in the time remaining field is the equivalent of:

d bleachertweet oxford 40 cambridge 38 2nd 9:12

A timestamp is attached that indicates the time that the command was sent. The system ingests the incoming direct message, analyzes and processes the tokens. A query is performed against the APIs configured for the federation, which could include ESPN Rise, Meridix, Sports Power (Active Network), et al. The system returns the following formatted response as an update to the Twitter account of the athletics department (response method configured in his user profile):

Current Score: Oxford 40 Cambridge 38—2nd 9:12

The system returns the following formatted response as an SMS to the cell phone of the local television sports reporter (response method configured in his user profile):

Current Score: Oxford 40 Cambridge 38—2nd 9:12

The system returns the following formatted response as an RSS feed that is parsed by the JavaScript portlet embedded on the Oxford website (response method configured in his user profile):

|  | Current Score | |
|---|---|---|
| Oxford (2-0) | 40 | 2nd 9:12 |
| Cambridge (3-0) | 38 | |

Additional information queried from data sources is provided in the RSS feed and displayed in the JavaScript portlet. For example, the team records are displayed.

If Robert wants to add statistics for an individual player, Robert selects a player from the roster (configured during registration). Robert selects Jason Smith. He enters 18 in the points field, 4 in the assists field, 6 in the rebounds field, and 9:12 in the time remaining field. Upon submission, the system maps the statistics entered by Robert to a command. Robert's entry is the equivalent of:

d bleachertweet Jason smith 18 pts 4 ast 6 reb 2nd 9:12

A timestamp is attached that indicates the time that the command was sent. The system ingests the incoming direct message, analyzes and processes the tokens. A query is performed against the APIs configured for the federation, which could include ESPN Rise, Meridix, Sports Power (Active Network), et al. The system returns the following formatted response as an update to the Twitter account of the athletic department (response method configured in his user profile):

Jason Smith: 18 PTS, 4 AST, 6 REB—2nd 9:12

The system returns the following formatted response as an SMS to the cell phone of the local television sports reporter (response method configured in his user profile):

Jason Smith: 18 PTS, 4 AST, 6 REB—2nd 9:12

The system returns the following formatted response as an RSS feed that is parsed by the JavaScript portlet embedded on the Oxford website (response method configured in his user profile):

Jason Smith: 18 PTS, 4 AST, 6 REB—2nd 9:12
(21 PPG, 0.512 FG %, 2.6 RPG)

Additional information queried from data sources is provided in the RSS feed and displayed in the JavaScript portlet. For example, Jason's seasonal statistics are displayed.

If Robert wants to add commentary, Robert enters "JS steals pass and returns for 2 pts" in the comments field and 9:12 in the time remaining field. Upon submission, the system maps the comment entered by Robert to a command. Robert's entry is the equivalent of:

d bleachertweet JS steals pass and returns for 2 pts 2nd 9:12

A timestamp is attached that indicates the time that the command was sent. The system ingests the incoming direct message, analyzes and processes the tokens. A query is performed against the APIs configured for the federation, which could include ESPN Rise, Meridix, Sports Power (Active Network), et al. The system returns the following formatted response as an update to the Twitter account of the athletic department (response method configured in his user profile):

JS steals pass and returns for 2 pts—2nd 9:12

The system returns the following formatted response as an SMS to the cell phone of the local television sports reporter (response method configured in his user profile):

JS steals pass and returns for 2 pts—2nd 9:12

The system returns the following formatted response as an RSS feed that is parsed by the JavaScript portlet embedded on the Oxford website (response method configured in his user profile):

JS steals pass and returns for 2 pts
Jason Smith: 18 PTS, 4 AST, 6 REB—2nd 9:12
(21 PPG, 0.512 FG %, 2.6 RPG)

Additional information queried from data sources is provided in the RSS feed and displayed in the JavaScript portlet. For example, Jason's seasonal statistics are displayed.

If Robert wants to post a video, he captures a play using the video capability of the BleacherTweet Smartphone application (built upon native Smartphone functionality) and enters "JS steals pass and returns for 2 pts" in the comments field and 9:12 in the time remaining field. Upon submission, the system maps the comment entered by Robert to a command. Robert's entry is the equivalent of:

d bleachertweet JS steals pass and returns for 2 pts 2nd 9:12 clipname.mov

A timestamp is attached that indicates the time that the command was sent. The movie clip is attached to the command. The system ingests the incoming direct message, analyzes and processes the tokens. A connection is made to the video hosting server through an API. The hosting server may be managed by the TwitCommand Service or 3rd party hosting provider (YouTube, Veoh, Kaltura, et al). The movie is uploaded to the hosting server and a URL is generated for browser based access and streaming of the file. A query is performed against the APIs configured for the federation, which could include ESPN Rise, Meridix, Sports Power (Active Network), et al. The system returns the following formatted response as an update to the Twitter account of the athletic department (response method configured in his user profile):

JS steals pass and returns for 2 pts—2nd 9:12 http://url
where url is a shortened URL to a webpage that contains the streaming video file. Advertising could be placed on the webpage.

The system returns the following formatted response as an SMS to the cell phone of the local television sports reporter (response method configured in his user profile):

JS steals pass and returns for 2 pts—2nd 9:12 http://url
where url is a shortened URL to a webpage that contains the streaming video file. Advertising could be placed on the webpage.

The system returns the following formatted response as an RSS feed that is parsed by the JavaScript portlet embedded on the Oxford website (response method configured in his user profile):

JS steals pass and returns for 2 pts
http://url
Jason Smith: 18 PTS, 4 AST, 6 REB—2nd 9:12
(21 PPG, 0.512 FG %, 2.6 RPG)

where url is a shortened URL to a webpage that contains the streaming video file. Advertising could be placed on the webpage. Additional information queried from data sources is provided in the RSS feed and displayed in the JavaScript portlet. For example, Jason's seasonal statistics are displayed. NOTE: This use case has integration potential as a plugin into sports score and statistics equipment and software, including but not limited to, Daktronics and Vicom. Automated rather than manual commands could be sent by the software.

Example 3

Ticket and Event Information

Gregory is an avid Prince fan. He uses his WordPress blog prince4pres.com to update other Prince fans with news and gossip, sightings, concert announcements, performance commentary, photos, videos, etc. He maintains Twitter and Facebook accounts in support of his blog, often reposting the same information. Gregory gathers information by visiting multiple websites and querying search engines. He also receives information via email from other Prince fans. He is constantly looking for new information to post. Twicket is a software application that allows Gregory to fetch news and events for music artists.

Gregory visited the twicket.com website to register for the TwitCommand Service (Twitter ID twicket), and has authenticated and authorized his Twitter account to be used by the TwitCommand Service. During the registration process, Gregory set his subscription based query and update preferences to once per week. Gregory configured his blog, Twitter, and Facebook accounts as the response delivery methods.

The TwitCommand Service performs federated queries based on Gregory's subscription preferences scheduled at once per week. The variable "Prince" is passed to HotTicket, GoogleTV, Google Calendar, Google News, and other APIs configured for the federation. The system returns the following formatted response as an update to his blog and his Facebook account (response methods configured in his user profile):

New this Week for Prince, August 15

Prince owes $4 million for flaking out on fragrance deal (popcrush.com)
Recording rumors sparking new album rumors (startribune.com)
Morris Day on new Time album and Prince (arizonarepublic.com)

Upcoming Events

August 31: Under a Purple Moon: An Evening of Prince Music Tribute (Cleveland, Ohio)
September 1: MTV Video Music Awards (New York, N.Y.)
September 5: Aftershow @ 20/20 Club (Los Angeles, Calif.)
October 11: Jimmy Kimmel Live (Los Angeles, Calif.)

Now Playing

Now through December 15: Purple Rain, Starz OnDemand
Pop Life Remix now in iTunes Due to the character length restrictions for Twitter updates, the response is formatted differently as follows:

New this week for Prince, August 15 http://url
where url is a shortened URL to a webpage that contains the formatted results from the federated query. Advertising could be placed on the webpage.

If Gregory wants to perform an on-demand query (non-subscription) for a different artist and post the formatted response to the same configured response delivery methods stored in his user profile, he can send commands directly to the TwitCommand Service.

Gregory launches his preferred 3rd party Twitter application on his Smartphone. In the status update field of his preferred Twitter application, Gregory enters:

d twicket sade

The system ingests the incoming direct message, analyzes and processes the tokens. A federated query is performed against the HotTicket, GoogleTV, Google Calendar, Google News, and other APIs, passing the variable "sade" (contained in the command). The system returns the following formatted response as an update to his blog and his Facebook account (response methods configured in his user profile):

New for Sade, August 15

Sade warms souls at MGM Grand (Las Vegas Review)
Live review: Sade at the Staples Center (Los Angeles Times)

Upcoming Events

September 7: Frank Erwin Center (Austin Tex.)
September 10: Greensboro Coliseum (Greensboro, N.C.)
October 29: Saku Arena (Sofia, Bulgaria)
November 2: Hartwell Arena (Helsinki, Finland)
November 5: New Arena (St. Petersburg, Russian Federation)
November 8: Crocus Hall (Moscow, Russian Federation)
November 16: SAP Arena (Manheim, Germany)
November 20: Lotto Arena (Antwerp, Belgium)
November 22: Arena (Zagreb, Croatia)
November 25: Wiener Stadhalle (Vienna, Austria)

Sade: the Ultimate Collection

The new 2CD+DVD bundle available now $24.99!
Due to the character length restrictions for Twitter updates, the response is formatted differently as follows:
New for Sade, August 15 http://url
where url is a shortened URL to a webpage that contains the formatted results from the federated query. Advertising could be placed on the webpage.

Example 4

Voting

Tina is a huge fan of Country Idol, an amateur singing competition. She regularly watches each season and votes for her favorite singers. She has a Smartphone, but does not have SMS service and cannot take advantage of the short code SMS voting functionality. Tina has to dial a 1-866 number to cast a vote for her favorite singer. Due to voting call volume, circuits are typically busy and she has to dial numerous times to cast a single vote. She is looking for a convenient way to support her favorite singers without dialing the 866 number or sitting in front of the Country Idol website.

Tina visited the TwitIdol.com website to register for the TwitCommand Service (Twitter ID twitidol), and has authenticated and authorized her Twitter account to be used by the TwitCommand Service. During the registration process, Tina configured her Twitter and Facebook accounts as the response delivery methods.

Tina launches her preferred 3rd party Twitter application on her Smartphone. In the status update field of her preferred Twitter application, Tina enters:
    d twitidol fake
    d twitidol webber
    d twitidol fake webber
        or
    d twitidol XXXX A first name (if unique), last name (if unique), a combination of first name and last name, or the contestant number XXXX (given to each contestant) could be used to vote for an individual singer. The system ingests the incoming direct message, analyzes and processes the tokens. A connection is made to the Country Idol voting API passing the variable "jake" and/or "webber" or "XXXX" (contained in the command). The votes for the contestants are tabulated and displayed live on CMT in a banner overlay. The system returns the following formatted response as an update to her Twitter account (response method configured in her user profile):
    I just voted for Jake Webber on Country Idol!
    Final results show Wed December 8 8 PM on CMT
The system returns the following formatted response as an update to her Facebook account (response method configured in her user profile):
    I just voted for Jake Webber on Country Idol!
    Final results show Wed December 8 8 PM on CMT
    I am voting using the TwitIdol system, brought to you by Wrangler.
    Join Tina and vote today!
The response includes a hyperlinked advertisement.

Example 5

Fundraising

Lisa regularly donates to her favorite organizations. She is looking for an easier way to make donations and keep track of her giving. TwitDonate is a software program that allows Lisa to send, share, and track her donations. For select organizations partnered with TwitDonate, Fortune 500 companies make matching donations.

Lisa visited the twitdonate.com website to register for the TwitCommand Service (Twitter ID twitdonate), and has authenticated and authorized her Twitter account to be used by the TwitCommand Service. Lisa can only donate to organizations configured in her user profile to the maximum threshold she sets. During the registration process, Lisa set her maximum donation threshold amount to $100. She configured her Paypal account as her payment source. From the list of available non-profit organizations partnered with the TwitCommand Service, she selected The American Red Cross and the Barack Obama 2012 Presidential Campaign to support. She added 2 additional organizations to support which required custom configuration: Mount Vernon Presbyterian Church and the Atlanta Animal Shelter. To add these organizations, Lisa configured the Paypal account for each organization and provided a nickname, "church" and "shelter". She also provided the URL for each organization. Lisa configured her Twitter and Facebook accounts as the response delivery methods.

Lisa launches her preferred 3rd party Twitter application on her Smartphone. In the status update field of her preferred Twitter application, Lisa enters:
    d twitdonate obama 25
The system ingests the incoming direct message, analyzes and processes the tokens. A connection is made to the Paypal API passing the variables of her Paypal "userID" and "password" (configured in her user profile), the payment amount of "25" (contained in the command), and "obama" which maps to the Obama 2012 Presidential Campaign (configured in the TwitCommand Service). The system returns the following formatted response as a status update to her Twitter account (response method configured in her user profile):
    I just donated $25 to the 2012 Barack Obama Presidential Campaign.
    The URL of partner organizations is configured in the TwitCommand Service. Upon selection of the hyperlinked name of the partner organization, the system displays the website of the organization.

The system returns the following formatted response as an update to her Facebook account (response method configured in her user profile):

I just donated $25 to the 2012 Barack Obama Presidential Campaign.
    I am making my donation with the TwitDonate system. Join me and make your donation today!

The response includes a hyperlinked advertisement.

If Lisa wants to donate to the thanksgiving food drive of her church, Lisa enters:

d twitdonate 10 church thanksgiving food drive

The system returns the following formatted response as a status update to her Twitter account (response method configured in her user profile):

I just donated $10 to Mount Vernon Presbyterian Church

The comment "thanksgiving food drive" is passed through the Paypal API as special instructions which will be sent with the payment to the church. The system returns the following formatted response as an update to her Facebook account (response method configured in her user profile):

I just donated $10 to Mount Vernon Presbyterian Church for thanksgiving food drive.
    I am making my donation with the TwitDonate system. Join me and make your donation today!

The response includes a hyperlinked advertisement.

Example 6

Deals and Coupons

Adrienne is a frugal shopper. She runs a WordPress blog, peachdeals.com, that re-publishes deals and coupons for products and services that women in her community might be interested in. She and visitors of her blog provide reviews for the products and services, as well as the merchants offering the deals. Adrienne gathers information by collecting print circulars and visiting multiple websites including Groupon, LivingSocial, and DealChicken. She also receives information from merchants via email newsletters and receives direct email submissions from her readers. Adrienne is looking for more deals to share. TwitDeals is a software program that allows Adrienne to find deals for specific products and services in her area and share them with her friends and followers.

Adrienne visited the twitdeals.com website to register for the TwitCommand Service (Twitter ID twitdeals), and has authenticated and authorized her Twitter account to be used by the TwitCommand Service. During the registration process, Adrienne set Atlanta, Ga. as her default location and set a maximum threshold of 5 for the number of deals returned per query based on proximity to Atlanta, Ga. She configured her blog as the response delivery method.

Adrienne launches her preferred 3rd party Twitter application on her Smartphone. In the status update field of her preferred Twitter application, Adrienne enters:

d twitdeals massage

The system ingests the incoming direct message, analyzes and processes the tokens. The tokens determine which APIs are queried. For example, if travel related tokens are passed, Expedia or TravelPort APIs may be invoked. If consumer categories or product names are passed, ShopLocal, Amazon, Groupon, Adility, CBS Local Offers, Yipit, or DealMap (recently acquired by Google) APIs may be invoked. The Google Maps API is used to fetch maps and directions to merchant locations. A query is performed against the APIs configured for the federation passing the variable "massage" (contained in the command) and "Atlanta, Ga." (configured in her user profile). The system returns the following formatted response as an update to her blog (response method configured in her user profile):

Harmony Decatur
    1549 Clairmont Road Decatur, Ga. 30033 404-918-9585
    Get map and directions
    $40 for a 1 hour Swedish massage (33% off)
    Redeem October 5 only, between 9:30 AM and 7:30 PM. Massage appointment subject to availability. Limit 1 per person, per visit. Please call 404-918-9585 to make an appointment.

If there is more than one match for the query, each match is delivered as a separate blog post. Within the administration panel of her blog, Adrienne set a status of pending for all updates made by automated systems. This allows her to approve automated updates before they are posted to her blog.

If Adrienne wants to search for a deal for a specific brand or product, Adrienne enters:

d twitdeals pantene shampoo

The system returns the following formatted response as an update to her blog (response method configured in her user profile):

Pantene PRO-V Classic Clean Shampoo 12.6 OZ 2 for $5 (50% off)CVS
    842 Peachtree Street, Atlanta, Ga. 30308
    404-892-8468
    Get map and directions
    Find another location near you
    Gently cleanses hair for a healthy shine. You have normal hair. You want strong and healthy hair that shines. Advanced Pantene Pro-V Classic Care Shampoo and Conditioner system: is specially designed to make hair shiny and healthy-looking from root to tip; leaves hair manageable and strong against damage. Made in USA of US and/or imported ingredients.
    Redeem October 5 through October 12. Limit 2 per customer.

Example 7

Product Availability and Pricing

Mark is a technophile. He is an early adopter of gadgets and often writes online reviews after buying them. Mark wants to be able to find the best price for the gadgets that he is interested in and share that information with his friends. Twitgadgets is a software application that allows Mark to search online and brick and mortar merchants for specific gadgets. He can view the best prices and availability of the gadgets, and share them with his friends.

Mark visited the twitgadgets.com website to register for the TwitCommand Service (Twitter ID twitdgadgets), and has authenticated and authorized his Twitter account to be used by the TwitCommand Service. During the registration process, Mark set Atlanta, Ga. as his default location and set a maximum threshold of 5 for the number of matches returned per query. He selected the option to include Internet merchants and selected the option to return results based on the lowest price. He configured the Technophile group of his Google+ account, Twitter, and Linked In accounts as the response delivery methods.

Mark launches his preferred 3rd party Twitter application on his Smartphone. In the status update field of his preferred Twitter application, Mark enters:

d twitdeals hp touchpad 32 gb

The system ingests the incoming direct message, analyzes and processes the tokens. A query is performed against the APIs configured for the federation, which could include Best Buy, Amazon, Shopping.com, Google Shopping, Yahoo Shopping, Shopzilla, PriceGrabber, et al. The system passes the variables "hp", "touchpad", and "32 gb" (contained in the command). The Google Maps API is used to fetch maps and directions to brick and mortar merchant locations, if applicable. The system returns the following formatted response as an update to his Technophile group of his Google+ account (response method configured in his user profile):

HP TouchPad 32 GB Gloss Black
webOS 3.0, 1.2 GHz, 1 GB RAM, 1 year warranty
TouchPad includes essential productivity apps right out of the box. Collaborate with colleagues using Google Docs or Box.net. Print wirelessly to compatible networked HP printers. And browse the full web at blazing speed with support for the latest web technologies. The next . . . read more
1. Best Buy $99—Limited Quantities
2537 Piedmont Rd NE, Atlanta, Ga. 30324
404-842-0938
Get map and directions
Find another location near you
2. HP Store $99—Limited Quantities
3. Amazon.com $119—33 at this price
4. Mr. Smart Shop $166—6 at this price
5. Walmart $177
1801 Howell Mill Road NW, Atlanta, Ga. 30318
404-352-5252
Get map and directions
Find another location near you The system returns the following formatted response as a status update to his Linkedin and Twitter accounts (response methods configured in his user profile):
Get an HP TouchPad 32 GB here http://url
where url is a shortened URL to a webpage that contains the formatted results from the federated query. Advertising could be placed on the webpage.

Example 8

Technical Support

Charlie is an avid gamer. The Battlefield franchise, made by Electronic Arts, is her current favorite. New to the recently released Battlefield 3, she has experienced some difficulty navigating the new interfaces and levels. Charlie wants help on demand without having to manually navigate the different support forums and blogs. TwitBattlefield3 is a software application that allows Charlie to search for Battlefield help and share the information with her friends.

Charlie visited the Electronic Arts Battlefield 3 website to register for the TwitCommand Service (Twitter ID twitbattlefield3), and has authenticated and authorized her Twitter account to be used by the TwitCommand Service. During the registration process, she selected the XBox360 as her gaming platform. She configured the Battlefield group of her Google+ account and her Twitter account as the response delivery methods.

Charlie launches her preferred 3rd party Twitter application on her Smartphone. In the status update field of her preferred Twitter application, Charlie enters:
d twitbattlefield3 disable tanks
The system ingests the incoming direct message, analyzes and processes the tokens. A query is performed against the APIs configured for the federation, which could include Battlefield 3 Forums, GamePro Playmaker, Gamespot, IGN, et al. The system passes the variables "disable" and "tanks" (contained in the command). The system returns the following formatted response as an update to both her Battlefield group of her Google+ account and her Twitter account (response methods configured in her user profile):
Disable tanks in EA's Battlefield 3 http://url
where url is a shortened URL to a webpage that contains the formatted results from the federated query. Advertising could be placed on the webpage.

Example 9

Education/Learning Support

Jason wants to be a web developer. He is currently taking a course to learn the programming language PHP. Jason wants to be able to find code samples without having to manually search Google or refer to books. He would like to share the code samples with his classmates and peers. TwitPHP is a software application that allows Jason to search for PHP code samples and share the information with his friends.

Jason visited the twitphp.com website to register for the TwitCommand Service (Twitter ID twitphp), and has authenticated and authorized his Twitter account to be used by the TwitCommand Service. During the registration process, he has configured the Codejunkies group of his Google+ account and his Classmates list of his Twitter account as the response delivery methods.

Jason launches his preferred 3rd party Twitter application on his Smartphone. In the status update field of his preferred Twitter application, Jason enters:
d twitphp import csv
The system ingests the incoming direct message, analyzes and processes the tokens. A query is performed against the APIs configured for the federation, which could include Google Code, Zend, PHP.NET, MSDN, et al. The system passes the variables "import" and "csv" (contained in the command). The system returns the following formatted response as an update to the Codejunkies group of his Google+ account and to the Classmates list of his Twitter account (response methods configured in her user profile):
Import CSV in PHP http://url
where url is a shortened URL to a webpage that contains the formatted results from the federated query. Advertising could be placed on the webpage.

Example 10

Health and Fitness

Rachel is trying to lose 30 lbs. She has tried different diet plans with unsatisfactory results. She has decided to join a fitness club. Access to a personal trainer and nutritionist is included in her membership. Also included in her membership is a BetterFit account. BetterFit is a software program that allows Rachel to track her fitness and weight loss progress. Rachel can access her BetterFit account by visiting the website of the fitness club and/or by downloading an application for her Smartphone.

Rachel's personal trainer can create workout plans for her where she can review the plans, enter her performance (i.e. how many reps at what weight she completed), chart her progress, receive feedback, and order products including workout apparel and equipment.

Rachel's nutritionist can create a nutritional plan for her where she can review the plans, enter her performance (i.e. what she ate for breakfast), chart her progress, receive feedback, view recipes, view the nutritional content of different foods, and order products including nutrition bars, energy drink mixes, water bottles, and vitamins.

Rachel can enter her weight, blood pressure, and heart rate. She can also send messages to her personal trainer and nutritionist.

Rachel chose not to download the BetterFit application for her Smartphone. Instead she accesses her account by visiting the website of the fitness club. One method of input to the BetterFit application is a TwitCommand Service implementation (Twitter ID betterfit), where Rachel can send commands to update the system. She has previously visited the website of the fitness club to register for the TwitCommand Service, and has authenticated and authorized her Twitter account to be used by the TwitCommand Service. She has configured her Facebook account as the response delivery method.

Rachel launches her preferred 3rd party Twitter application on her Smartphone. In the status update field of her preferred Twitter application, Rachel enters:

d betterfit 155 or d betterfit weight 155

The system ingests the incoming direct message, analyzes and processes the tokens. A connection is made to the BetterFit system through an API and an update is made to her weight passing the variable "weight" and "155" (contained in the command). If a command is not entered, the default command for the system is "weight". The system returns the following formatted response as an update to her Facebook account (response method configured in her user profile):

Congratulations Rachel! You have lost another 6 lbs! Your total weight loss is now 15 lbs. Keep up the good work!

Rachel is losing weight with the BetterFit system. Special membership rates now with promo code #loseweight!

The response includes a hyperlinked advertisement with a promo code. Posting on Facebook allows her friends to "like" and "comment" on her progress, giving her encouragement and feedback. A multimedia enriched version of the same command could include a picture of herself, which would be stored in the BeterFit system and posted with the formatted response to her Facebook account.

If Rachel wants to update her blood pressure, Rachel enters:

d betterfit bp 120/80

Rachel configured her weight as the only value to share with her friends on Facebook. Her blood pressure is not shared. There would not be a Facebook update. A connection is made to the BetterFit system through an API passing the command "bp" and the variable "120/80" (contained in the command). The BetterFit system is updated with the blood pressure of "120/80" and a date and time stamp.

If Rachel wants to update her heart rate while exercising, Rachel enters:

d betterfit hr 82 treadmill mile 2

Rachel configured her weight as the only value to share with her friends on Facebook. Her heart rate is not shared. There would not be a Facebook update. A connection is made to the BetterFit system through an API and an update is made to her heart rate passing the command "hr" and the variables "82" and "treadmill mille 2" (contained in the command). The BetterFit system is updated with the heart rate of "82 bpm" and a date and time stamp. The description field associated with the entry is updated with "treadmill mile 2".

This use case has integration potential as a plugin into health and fitness equipment and monitoring software, including but not limited to, Nautilus, LifeSpan, Healthrider, Polar, Ironman, and AccuSplit. Automated rather than manual commands could be sent by the software.

Figure 8:
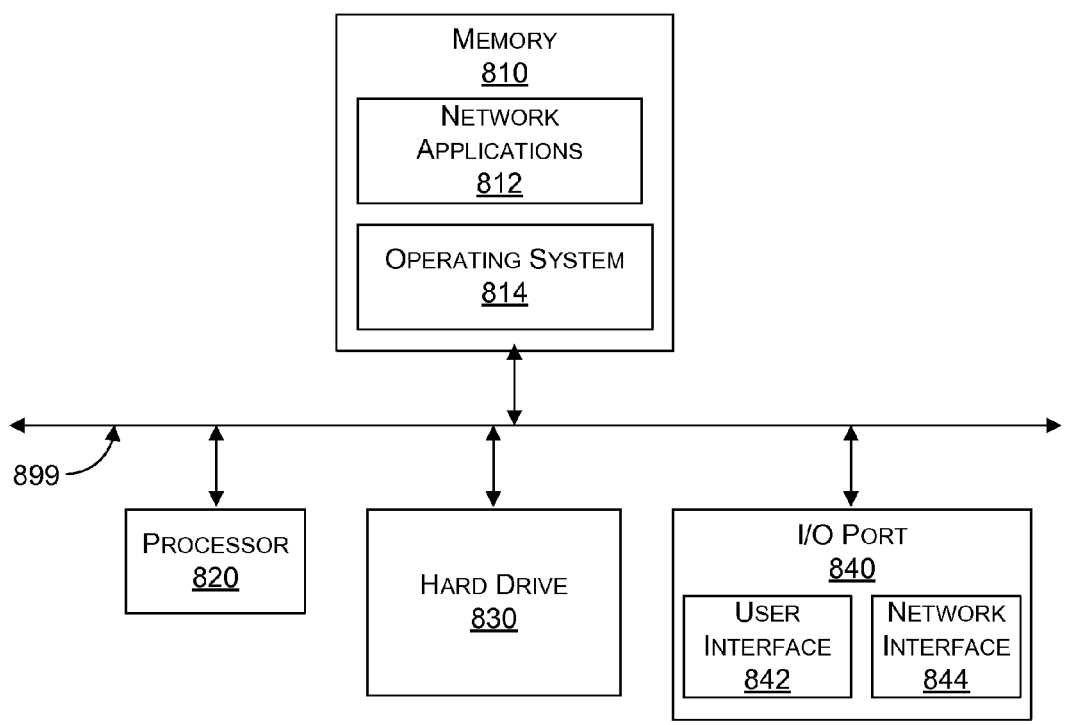
FIG. 8 is a block diagram illustrating an exemplary computing device, according to one embodiment.

FIG. 8 is a block diagram illustrating an exemplary computing device 800 for use in the system 100 of FIG. 1, according to one embodiment. The computing device 800 is an exemplary device that is implementable for each of the components of the system 100, including the user computing device 110, the social media servers 120, the application command server 130, and the data sources 140. Additionally, the system 100 is merely an example implementation itself, since the system 100 can also be fully or partially implemented with laptop computers, tablet computers, smart cell phones, Internet appliances, and the like.

The computing device 800, of the present embodiment, includes a memory 810, a processor 820, a hard drive 830, and an I/O port 840. Each of the components is coupled for electronic communication via a bus 899. Communication can be digital and/or analog, and use any suitable protocol.

The memory 810 further comprises network applications 820 and an operating system 822. The network applications 820 can be, for example, a web browser, a mobile application, an application that uses networking, a remote application executing locally, a network protocol application, a network management application, a network routing application, or the like.

The operating system 822 can be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 820 can be a general purpose processor, an application-specific integrated circuit (ASIC), a field programmable gate array (FPGA), a reduced instruction set controller (RISC) processor, an integrated circuit, or the like. There can be a single core, multiple cores, or more than one processor. The processor 820 can be disposed on silicon or any other suitable material. The processor 820 can receive and execute instructions and data stored in the memory 810 or the hard drive 830

The hard drive 830 can be any non-volatile type of storage such as a magnetic disc, EEPROM, Flash, or the like. The hard drive 830 stores code and data for applications.

The I/O port 840 further comprises a user interface 842 and a network interface 844. The user interface 842 can output to a display device and receive input from, for example, a keyboard. The network interface 844 connects to a medium such as Ethernet or WiFi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A computer-implemented method for controlling network-based applications by processing commands embedded within user-generated content postings to a social media service, comprising:
   receiving, by a computer, a content posting associated with a user of the social media service, the posting being submitted to the social media service as a status update or message to the social media account associated with the application;
   processing the content posting to generate a request to a data source, the request being a query for information or an instruction to perform an action, comprising:
   lexically parsing the content posting to identify the command,
   responsive to the content posting comprising text, tokenizing a textual content posting containing the command with delimiters into tokens, the tokens comprising a series of one or more of keywords, functions, operators, and parameters,
   responsive to the content posting comprising multimedia, tokenizing the multimedia enriched content posting containing the command with a decoder, the multimedia enriched content posting comprising at least one of an image, video, and audio, including retrieving a multimedia asset by following a local file path or URL (Universal Resource Locator) path of a web based asset, and scanning the multimedia asset for malicious software and viruses prior to processing, and extracting information from the multimedia asset with a decoder to translate the multimedia asset into tokens, and
   wherein processing the content posting further comprises: semantically matching tokens to language model definitions that define functions and operators for the application domain, matching functions and operators to corresponding code fragments and methods stored in a library unique to an application domain, and assimilating the code fragments and methods on-the-fly to generate executable code, comprising: fetching at least one of attributes, parameters, and custom commands from a user profile associated with a user that submitted the posting, fetching assimilation definitions that map functions and operators within the language model definitions to code fragments and methods, and fetching assimilation rules which define the relationship between assimilation definitions, declare which functions and operators can be combined to form legal connections, and specify the proper sequencing of code fragments and methods;
   sending the request to the data source;
   receiving a response to the request, the response comprising raw non-manipulated data from the data source;
   formatting the response in accordance with characteristics of a preconfigured response delivery method; and
   sending the formatted response for delivery as preconfigured by the user.

2. The method of claim 1, wherein receiving the content posting comprises:
   polling the social media service to retrieve new content postings with a GET method, the polling conducted at a rate allotted by the social media service.

3. The method of claim 1, wherein the data source comprises at least one of an internal data resource and an external data resource, and the data comprises dynamic data.

4. The method of claim 1, wherein processing the content comprises:
   semantically matching tokens to language model definitions that define functions and operators for an application domain; and
   matching functions and operators to corresponding code fragments and methods.

5. The method of claim 1, wherein processing the content comprises:
   assimilating the code fragments and methods dynamically as needed to generate executable code.

6. The method of claim 1, wherein generating a request to the data source comprises:
   selecting one or more data sources dynamically as needed based on a context of the content posting and configured data sources supported by the application; and
   formatting requests to one or more data sources by altering a syntax of the request as needed to communicate with the data source.

7. The method of claim 1, wherein receiving a response from a data source comprises:
   receiving and aggregating the responses from each data source, wherein each response comprises raw non-manipulated data from the data source; and
   parsing the data to extract desired data values in accordance with an initial command, discarding extraneous data values.

8. The method of claim 1, wherein formatting the response comprises:
   fetching a response delivery method preference from an application user profile associated with the user that submitted the content posting;

fetching a pre-configured template associated with the response delivery method user preference, the pre-configured template conforming to a response delivery method; and
inserting desired data values into the pre-configured template.

9. The method of claim 1, further comprising:
receiving a request from a user to follow the social media account associated with the application from a web page associated with the application;
in response to the follow request, registering the user with the application; and
automatically following-back the social media account associated with the user with the social media account associated with the application.

10. The method of claim 1, wherein the social media service comprises at least one of Twitter, Facebook, MySpace, Ning, FourSquare, LinkedIn, WordPress, Tumblr, Google+, Movable Type, LiveJournal, and Type Pad.

11. The method of claim 1, further comprising:
detecting from the command of the content posting that multiple types of data are needed,
wherein transforming the command of a content posting into executable code for generating a request to a data source comprises generating separate request for separate data types.

12. The method of claim 1, wherein the command includes a delineator to indicate the command.

13. A non-transitory computer-readable medium storing instructions that when executed by a processor, perform a method for controlling network-based applications by processing commands embedded within user-generated content postings to a social media service, comprising:
Receiving a content posting associated with a user of the social media service, the posting being submitted to the social media service as a status update or message to the social media account associated with the application;
processing the content posting to generate a request to a data source, the request being a query for information or an instruction to perform an action, comprising:
lexically parsing the content posting to identify the command,
responsive to the content posting comprising text, tokenizing a textual content posting containing the command with delimiters into tokens, the tokens comprising a series of one or more of keywords, functions, operators, and parameters,
responsive to the content posting comprising multimedia, tokenizing the multimedia enriched content posting containing the command with a decoder, the multimedia enriched content posting comprising at least one of an image, video, and audio, including retrieving a multimedia asset by following a local file path or URL (Universal Resource Locator) path of a web based asset, and scanning the multimedia asset for malicious software and viruses prior to processing, and extracting information from the multimedia asset with a decoder to translate the multimedia asset into tokens, and
wherein processing the content posting further comprises: semantically matching tokens to language model definitions that define functions and operators for the application domain, matching functions and operators to corresponding code fragments and methods stored in a library unique to an application domain, and assimilating the code fragments and methods on-the-fly to generate executable code, comprising: fetching at least one of attributes, parameters, and custom commands from a user profile associated with a user that submitted the posting, fetching assimilation definitions that map functions and operators within the language model definitions to code fragments and methods, and fetching assimilation rules which define the relationship between assimilation definitions, declare which functions and operators can be combined to form legal connections, and specify the proper sequencing of code fragments and methods;
sending the request to the data source;
receiving a response to the request, the response comprising raw non-manipulated data from the data source;
formatting the response in accordance with characteristics of a preconfigured response delivery method; and
sending the formatted response for delivery as preconfigured by the user.

14. A computing device to controlling network-based applications by processing commands embedded within user-generated content postings to a social media service, comprising:
a processor;
a memory; and
a social media interface to receive a content posting associated with a user of the social media service, the posting being submitted to the social media service as a status update or message to the social media account associated with the application;
a command processing engine to process the content posting to generate a request to a data source, the request being a query for information or an instruction to perform an action, comprising:
a command parser to lexically parse the content posting to identify the command, and responsive to the content posting comprising text, the command processor to tokenize a textual content posting containing the command with delimiters into tokens, the tokens comprising a series of one or more of keywords, functions, operators, and parameters, and responsive to the content posting comprising multimedia, the command parser to tokenize the multimedia enriched content posting containing the command with a decoder, the multimedia enriched content posting comprising at least one of an image, video, and audio, including retrieving a multimedia asset by following a local file path or URL (Universal Resource Locator) path of a web based asset, scan the multimedia asset for malicious software and viruses prior to processing, and extract information from the multimedia asset with a decoder to translate the multimedia asset into tokens, and
a code generator to semantically match tokens to language model definitions that define functions and operators for the application domain, the code generator to match functions and operators to corresponding code fragments and methods stored in a library unique to an application domain, and the code generator to assimilate the code fragments and methods on-the-fly to generate executable code, comprising: fetching at least one of attributes, parameters, and custom commands from a user profile associated with a user that submitted the posting, fetching assimilation definitions that map functions and operators within the language model definitions to code fragments and methods, and fetching assimilation rules which define the relationship between assimilation definitions, declare which functions and operators can be combined to form legal connections, and specify the proper sequencing of code fragments and methods;

a data source query manager to send the request to the data source, and receive a response to the request, the response comprising raw non-manipulated data from the data source;

a response formatter to format the response in accordance with characteristics of a preconfigured response delivery method; and a response delivery service to send the formatted response for delivery as preconfigured by the user.

* * * * *